United States Patent [19]

Shigeyasu et al.

[11] 3,859,344

[45] Jan. 7, 1975

[54] PROCESS FOR CONTINUOUS PRODUCTION OF HIGHLY PURE TEREPHTHALIC ACID

[75] Inventors: Motoo Shigeyasu; Kenzo Kuihara, both of Ehime, Japan

[73] Assignees: Maruzen Oil Co. Ltd.; Maksuyama Petrochemicals Inc., both of Osaka, Japan

[22] Filed: Apr. 3, 1972

[21] Appl. No.: 240,520

[30] Foreign Application Priority Data
Apr. 3, 1971 Japan.............................. 46-20425

[52] U.S. Cl............................................ 260/524 R
[51] Int. Cl............................................ C07c 63/02
[58] Field of Search .............................. 260/524 R

[56] References Cited
UNITED STATES PATENTS
3,064,044  11/1962  Baldwin .............................. 260/524
3,170,768  2/1965  Baldwin .............................. 260/524

FOREIGN PATENTS OR APPLICATIONS
706,916  3/1965  Canada .............................. 260/524

Primary Examiner—Lorraine A. Weinberger
Assistant Examiner—Paul J. Killos
Attorney, Agent, or Firm—Sughrue, Rothwell, Mion, Zinn & Macpeak

[57]   ABSTRACT

The process for continuously producing highly pure terephthalic acid by the following steps comprising continuously charging a p-xylene feed together with a solvent and oxidation catalyst to a reactor in which liquid phase oxidation of p-xylene with oxygen is effected so as to produce terephthalic acid, intermittently withdrawing a portion of the reaction product so obtained from the reactor and charging it to a small-sized first crystallizer having a capacity sufficient to contain the amount of the reaction product withdrawn at one time from the reactor and treating it therein with a molecular oxygen-containing gas for a short period of time, thereafter withdrawing the major proportion of the reaction product from the first crystallizer and forwarding the same to a second crystallizer.

25 Claims, 1 Drawing Figure

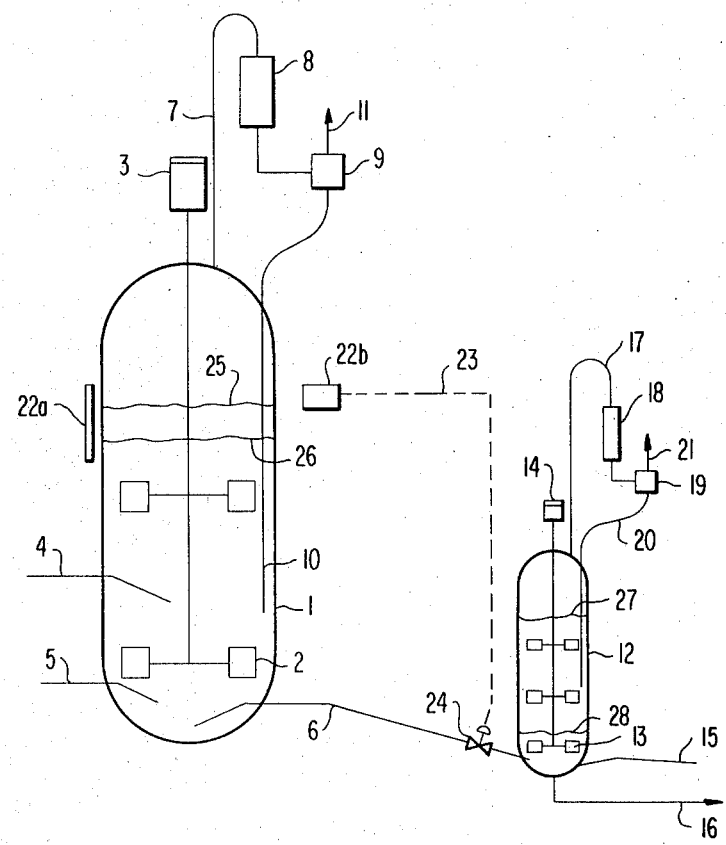

PROCESS FOR CONTINUOUS PRODUCTION OF HIGHLY PURE TEREPHTHALIC ACID

BACKGROUND OF THE INVENTION

1. Field of the Invention

The present invention relates to a process for the production of terephthalic acid by the continuous liquid phase oxidation of p-xylene. In more particular, it relates to a process for the production of highly pure terephthalic acid by withdrawing a reaction product formed in an oxidation reaction and intermittently charging said reaction product to a small-sized first crystallizer, and treating it further with oxygen-containing gas for a short period of time.

2. Description of the Prior Art

A number of processes have been hitherto proposed for the production of terephthalic acid by the oxidation of a para-dialkyl aromatic hydrocarbon such as p-xylene with molecular oxygen in the presence of a solvent such as acetic acid and an oxidation catalyst. These prior processes can be largely classified into the following groups according to the manner of carrying out the reaction. One is a batch process wherein the entire quantity of feed alkyl benzene, solvent and the catalyst is charged to a reactor prior to the reaction, then oxygen-containing gas is introduced to effect the reaction after which the entire reaction product is finally discharged out of the reactor after the reaction has been completed. Another is a semi-continuous process involving a method wherein a feed alkyl benzene (together with a portion of a mixture of solvent and catalyst in certain cases) is continuously introduced together with an oxygen-containing gas to a reactor to which the solvent and the oxidation catalyst have been preliminarily charged and the entire reaction product is withdrawn at one time from the reactor after the reaction has been completed. The last is a continuous process wherein the solvent and catalyst are continuously introduced to the reactor together with the feed alkyl benzene and oxygen-containing gas, and the reaction product is continuously withdrawn from the bottom of the reactor. Among these, the present invention is particularly directed to the improvement of the continuous process.

In a liquid phase oxidation of para-dialkyl benzene such as p-xylene to produce terephthalic acid, it is very difficult to complete the oxidation reaction and the terephthalic acid so obtained is contaminated with intermediate products such as 4-carboxybenzaldehyde, p-toluic acid etc. and other colouring by-products which result in the degradation in puritiy and reduction in the colour grade of the product.

In recent years, a so-called direct polymerization process where highly pure terephthalic acid is directly polymerized with ethylene glycol or ethylene oxide has been employed for the production of polyester from terephthalic acid with great benefits because it is economically advantageous over conventional processes in which terephthalic acid is polymerized after it has been once esterified into dimethyl terephthalate in that the product can be purified much easier than terephthalic acid. However, in the direct polymerization process high quality terephthalic acid is required as the raw material. Certain types of impurities contained in crude terephthalic acid, e.g., 4-carboxybenzaldehyde, are not by-products but intermediate compounds. Therefore it is important to complete the oxidation reaction of intermediate compound in order to effectively improve the purity of the product.

For this purpose, a variety of improvements have already been proposed for the completion of the liquid phase oxidation of p-xylene to produce highly pure terephthalic acid having less impurity content. For instance, Japanese Patent Publication No. 12695/1965 discloses a process in which the reaction product containing terephthalic acid, obtained after the end of the liquid phase oxidation of a para-substituted aromatic compound, is subjected to further oxidizing treatment with the oxygen-containing gas for another 1 hour or so at a higher temperature (e.g., 200°–300°C) than that employed in the main oxidation reaction to thereby produce terephthalic acid of high purity. Although this process is efficient in achieving the complete oxidation reaction, it is accompanied by such disadvantages that it results in unavoidable colouration of the product because of the formation of by-products due to prolonged treatment with oxygen at a higher temperature than that in the main oxidation reaction after the end of the oxidation reaction, and in the possibility of explosive hazards caused by the increase in the oxygen concentration in the reaction system which may exceed the explosive limit (8% by volume of oxygen content in gas phase) due to the continuous introduction of oxygen-containing gas to the system over an extended period of time. In U.S. Pat. No. 3,354,202, there is disclosed a process for producing benzene polycarboxylic acid by the liquid phase oxidation of polyalkyl benzenes in semi-continuous manner, which process is characterized by continuous introduction of air, after the charge of total amount of polyalkyl benzene feed has been completed, for a period of time equivalent to 1/10 to 1/1 the total requisite time for charging polyalkyl benzene so as to complete the oxidation reaction, whereby highly pure terephthalic acid containing little amount of intermediates such as 4-carboxybenzaldehyde can be obtained. According to this process, however, the quality of terephthalic acid so obtained is not yet satisfactory for use as a material in the direct polymerization process since the terephthalic acid obtained in the above-referred U.S. Patent process has an optical density ($\epsilon$ 380 m$\mu$) of greater than 0.1 and contains more than 0.1% of 4-carboxybenzaldehyde as impurity. Moreover, the process of the above United States Patent is effective when applied in a semi-continuous manner, because the oxidation reaction reaches its completion only when the air alone is introduced for a given time to the reactor still containing the reaction product which has been obtained after the oxidation reaction has once terminated after the entire feed methyl benzene had been continuously charged thereto, but it cannot be adapted to operation in a continuous manner in which the reaction product is continuously withdrawn out of the reaction system during the course of the oxidation reaction.

The continuous process wherein the feed alkyl benzene, solvent and catalyst are continuously charged to the reactor while continuously withdrawing the oxidation reaction product has a great industrial advantage since it attains far better space-time yield per unit capacity of the reactor and per unit hour and enables simplified operation compared to batch or semi-continuous processes. However, the continuous process entails such a disadvantage that the quality of terephthalic acid obtained is often unsatisfactory due to increased contents of unreacted feed materials and intermediate products, because the amount ratio of the reaction material which is withdrawn from the reactor without having sufficient residence time in the reactor is greater than that in batch or semi-continuous process.

There has been proposed up to now no effective industrial process for completing the liquid phase oxidation reaction in continuous manner to product terephthalic acid of high purity.

SUMMARY OF THE INVENTION

The inventors have performed extensive and elaborate studies on a process for the continuous production of terephthalic acid by the liquid phase oxidation of p-xylene with molecular oxygen in the presence of a heavy metal-containing oxidation catalyst and a lower aliphatic carboxylic acid solvent, and have now found an effective process whereby intermediate products are completely oxidized into terephthalic acid, and the formation of by-products due to the insufficiency of oxygen is prevented (this reaction is hereinafter referred to as "terminal reaction") to give highly pure terephthalic acid in a good yield by continuously operating liquid phase oxidation of para-xylene, intermittently withdrawing the reaction products from the oxidation reactor and charging said reaction product to a small-sized crystallizer, and therein completing oxidation reaction of said reaction product.

Briefly, the process of the present invention is characterized by the combination of the following specific procedures comprising intermittently withdrawing a portion of the oxidation reaction product from a reactor, charging the withdrawn product to a small-sized crystallizer having a capacity large enough to contain the portion of the reaction product withdrawn at one time from the reactor, treating the product in the crystallizer under similar temperature and pressure as employed in the oxidation reaction by introducing molecular oxygen-containing gas there into for a short period of time at such a rate that the oxygen concentration of the gaseous phase in the crystallizer never exceeds the explosive limit, then withdrawing the major portion of the reaction product from the small-sized crystallizer and charging it to a next crystallizer.

An object of the present invention is to provide a process for the production of highly pure terephthalic acid in a continuous manner.

Another object of the present invention is to provide a process whereby highly pure terephthalic acid is continuously produced by treating a crude reaction product obtained from the continuous oxidation reaction and containing terephthalic acid with oxygen-containing gas in a specified manner for a short period of time.

A further object of the present invention is to provide a process whereby fibre grade terephthalic acid suited for use as a material for so-called direct polymerization in which terephthalic acid is directly reacted, without requiring any additional purification treatments, with ethylene glycol or ethylene oxide to give high quality polyester suited for manufacture into fibre, which can thereby be directly produced by only an oxidation reaction step.

Other objects and advantageous features of the present invention will become apparent as the detailed description of the invention proceeds hereinbelow.

BRIEF EXPLANATION OF THE DRAWING

FIG. 1 is a schematic flowsheet illustrating an embodiment of the process of this invention.

DETAILED DESCRIPTION OF THE INVENTION

The essential constitution of the present invention is in a process for the continuous production of highly pure terephthalic acid wherein p-xylene is continuously introduced into an oxidation reactor together with a solvent and an oxidation catalyst and oxidized in a liquid phase with molecular oxygen or molecular oxygen-containing gas, and terephthalic acid so formed is subsequently separated and recovered by means of crystallization from the reaction mixture, an improvement which comprises operating the following steps in sequence:

a. intermittently withdrawing a portion of the oxidized reaction product from the oxidation reactor, b. charging the withdrawn reaction product to a small-sized first crystallizer having a capacity sufficient to contain the amount of the reaction product withdrawn at one time, c. oxidatively treating the reaction product in said first crystallizer at a temperature and pressure nearly equal to or below that employed in the preceding oxidation reaction, by introducing molecular oxygen-containing gas for a period of 1–5 minutes at such a rate that the oxygen concentration in the system never reaches beyond the explosive limit, and d. withdrawing the major portion of the reaction product contained in the first crystallizer and transferring it to a subsequent second crystallizer.

According to the process of this invention, the reaction product intermittently withdrawn in a defined portion from the oxidation reactor is charged to the small-sized crystallizer and active compounds contained in the reaction product which can particularly be subjected to an additional terminal reaction (i.e., those substances which are present in a very small amount in the reaction product but cause serious degradation and deterioration in the colour value and purity of the product terephthalic acid by being converted into by-products or by being contained in the reaction product unreacted) are efficiently contacted in the small-sized crystallizer with oxygen-containing gas which is introduced thereto for a short period of time in a relatively large amount but below the explosive limit to thereby complete the terminal reaction while effecting the conversion of various impurities contained in the reaction product into either terephthalic acid or other innocuous substances, so that it has now become possible to produce highly pure terephthalic acid in a good yield.

In a conventional process for carrying out the oxidation reaction in continuous manner, it has been usual to employ such a method as disclosed, for example, in U.S. Pat. No. 2,962,361, wherein the reaction product continuously withdrawn from the oxidation reactor is continuously introduced into one or more large-sized crystallizer or crystallizers and allowed to reside therein for a time suitable for effecting the crystallization of terephthalic acid. According to that United States Patent where the reaction product is continuously discharged at a defined flow rate from the oxidation reactor then introduced to a large-sized crystallizer while continuously discharging the reaction product from the crystallizer at a flow rate similar to that of introduction, it is impossible, however, to attain a sufficient effect of terminal reaction even when oxygen-containing gas is introduced continuously to the crystallizer. This is because of the reason, stated previously, that the amount of the active reaction products which should particularly be subjected to the terminal reaction is so small in comparison with the entire content in the crystallizer since a large quantity of the reaction product is always present in the crystallizer through which the reaction product is continuously introduced and discharged at a constant flow rate, that the concentration of the active components to be oxidized becomes remarkably low to such an extent that they cannot be effectively oxidized due to insufficient contact with oxygen introduced in such an amount so as not to exceed the explosive limit, i.e., less than 8% by volume content as the concentration in the vapour phase of the reactor. In other words, the rate of the introduction of oxygen gas used in the prior process is too small to ensure sufficient and intimate contact with the active component present in the reaction product in an extremely diluted state so that the terminal reaction always takes place insufficiently due to the lack of oxygen gas in the crystallizer. In addition, it is impossible to improve the effect of the terminal reation even if the rate of oxygen to be introduced is increased to a considerable extent since the rate of the consumption of oxygen is so small that the concentration of oxygen in the system becomes increasingly greater by the continuous introduction of oxygen-containing gas to thereby immediately exceed the explosive limit which makes industrial operation dangerous. Such inefficient terminal reaction which takes place in the case when the reaction product is charged to and discharged from the crystallizer in a continuous manner is also attributable to the inevitable phenomenon that a portion of the reaction product is compelled to be withdrawn from the crystallizer without staying in the crystallizer for a period sufficient to be contacted with oxygen.

According to the process of this invention, terephthalic acid of high purity can be continuously produced in a good yield without being accompanied by the foregoing disadvantages.

The process of this invention may be applicable to any processes for the continuous production of terephthalic acid by the liquid phase oxidation of p-xylene, but it is particularly useful for the production of fiber grade terephthalic acid which is utilized as a material for the direct polymerization process in which terephthalic acid is directly reacted with ethylene glycol or ethylene oxide.

The liquid phase oxidation of p-xylene in the process of the present invention is carried out in any conventional manner, but particularly desirable reaction conditions therefor are as follows:

The reaction temperature employed is within the range of 80°–250°C, preferably of 130°–200°C. Since the reaction is conducted in a liquid phase, the reaction should be carried out under superatmospheric pressure so as to maintain p-xylene and the solvent in liquid phase at the reaction temperature. A reaction pressure of 2–30 Kg/cm² gauge is generally preferred. The average residence time of the reactants in the oxidation reactor is 0.5–5 hours, preferably 1–3 hours.

The solvent to be used includes lower aliphatic carboxylic acids such as acetic, propionic and butyric acids. Among these, the use of acetic acid is especially desirable. The amount of solvent to be used is at least about twice the weight of p-xylene charge stock, but the use of three to six times is desirable in general. The oxidizing agent to be used is molecular oxygen or a gas containing molecular oxygen. The term oxygen-containing gas includes those gases having an oxygen concentration above 7% by volume and the use of air is most convenient and desirable. The quantity of oxygen used is 3–500 mols, preferably 5–300 mols per mol of p-xylene.

The catalyst to be used includes cobalt, manganese and the like heavy metal-containing compounds and bromine-containing compounds. As the heavy metal-containing compounds, inorganic salts, naphthenates and lower aliphatic acid salts of cobalt and manganese are especially desirable. As the bromine-containing compounds, hydrogen bromide, cobalt bromide, sodium bromide, potassium bromide, elementary bromine and bromine-containing organic compounds such as tetrabromoethane are typically included. It is also possible to use other reaction promoters such as ketones, aldehydes etc.

The reaction product which has completed its oxidation reaction is intermittently withdrawn in defined portions from the reactor and then introduced to a subsequent first crystallizer. The quantity of the reaction product withdrawn at one time may be determined to an appropriate value by considering such variables as the property of the crude terephthalic acid contained in the reaction product, quality of the product terephthalic acid, efficiency of the terminal reaction in the first crystallizer, yield of terephthalic acid per hour etc. In general, it is preferred to carry out the withdrawing operation at an interval of every 2–10 minutes. By operating in this way, a portion of the reaction product in the amount equivalent to the sum of p-xylene plus catalyst-solvent liquid mixture charged to the oxidation reactor during a period chosen within the range of the interval of 2–10 minutes is transferred from the reactor as an amount discharged at one time to the first crystallizer. In this case, the actual amount of discharge at one time is usually much greater than the sum of p-xylene plus catalyst-solvent mixture charged to the reactor during a period of the interval of discharge owing to an increased volume of the content compared with the state before entering the reactor. In general, such increase or expansion of the volume in the oxidation reactor reaches an increment of 20–40% greater, though it varies depending upon the reaction conditions employed, than the initial volume before being charged into the oxidation reactor because of unavoidable phenomena involving thermal expansion of the contents during the reaction at high temperature, presence of oxygen-containing gas in the slurry, formation of 2 mols water and 1 mol terephthalic acid out of 1 mol of p-xylene etc.

Too long an interval of the discharge beyond the above-mentioned range, i.e., 2–10 minutes, which means the removal in excessively great amounts of the reaction product at one time, is not desirable because the fluctuation of the liquid level in the reactor increases and it makes the progress of the oxidation reaction unstable. On the other hand, too short an interval in a discharge of the period below the afore-mentioned range, i.e., removal in reduced amount of the reaction product at one time is not desirable because it results in shortening the period of the terminal reaction so as to prevent sufficient terminal reaction.

The interval of the withdrawal of the reaction product should be determined so as to be longer than the sum of the time required for effecting the terminal reaction, time required for charging the reaction product from the oxidation reactor to the first crystallizer and the time required for the discharge of the reaction product from the first crystallizer to the second crystallizer.

The reaction product thus intermittently withdrawn in defined portions from the oxidation reactor should be intermediately charged into the first crystallizer and subjected therein to the terminal reaction. No desirable effect of the terminal reaction is achieved when the reaction product is charged to the crystallizer after long duration of time from the end of the oxidation reaction.

The first crystallizer is provided with a reflux condenser and stirrer similar to the oxidation reactor since the oxidation reaction at high temperature and elevated pressure takes place therein. The capacity of the first crystallizer may be smaller than that of the oxidation reactor and it may be a conventional type crystallizer. In greater particularity, the crystallizer desirably has a capacity such that the reaction product withdrawn at one time from the oxidation reactor occupies 30–70%, preferably 50–70% by volume of the total capacity of the crystallizer vessel. The use of crystallizer with a capacity which is only filled to a degree of less than 30% by volume of its total capacity with the reaction product withdrawn at one time is not desirable since it is no more economically advantageous and results in insufficient contact between the reaction product and oxygen-containing gas which in turn leads to poor efficiency of the terminal reaction.

The process of the present invention is thus characterized by carrying out charging and discharging operation of the reaction product intermittently at defined portions using a relatively small-sized vessel as the first crystallizer. A similar successful result will never be obtainable if the charge and discharge of the reaction product are carried out continuously even using a small-sized crystallizer for the purpose of reducing the quantity of the reaction product to be contained in the first crystallizer because a portion of the reaction product charged to the crystallizer is prevented from contact with oxygen-containing gas owing to short residence time attained and is expelled out of the crystallizer after incomplete terminal reaction which leads to non-uniform reaction throughout the entire reaction materials and terephthalic acid having only poor purity is produced.

After the charging operation of the reaction product into the crystallizer has been finished, the terminal reaction is carried out by introducing oxygen-containing gas thereto. The terminal reaction is operated at a temperature and pressure nearly equal to or below that employed in the main oxidation reaction. The temperature in the range of 80°–250°C, preferably 130°–200°C and pressure in the range of 2–30 Kg/cm$^2$ are particularly desirable. Operations at too low temperature will result in poor effect of the terminal reaction and too high a temperature will give a detrimental influence on the quality of product terephthalic acid. In the case that terminal reaction in the first crystallizer is operated under lower pressure and temperature than that of main oxidation reaction in the oxidation reactor, crystallization of a part of terephthalic acid in the reaction mixture takes place.

The molecular oxygen-containing gas preferably has an oxygen content of at least 7% by volume, and the use of air is most advantageous. The quantity of air used is preferably 10–50 HM$^3$ per ton of the reaction product, though it varies depending upon the quality of terephthalic acid desired, the concentration of oxygen in the terminal reaction system and other reaction conditions. It is preferred that the feed rate of oxygen containing gas is as large as possible, and the period of the terminal reaction is as short as possible, generally, for 1–5 minutes. Longer time in the terminal reaction will only invite explosive hazards by the increase in the oxygen content but also result in degradation in the quality of product terephthalic acid.

After finishing the terminal reaction, the reaction product in the first crystallizer is admitted into the second crystallizer. In this instance, it is desirable to create inside the vessel a liquid-sealed state by leaving at all times a portion of the reaction product inside the vessel instead of discharging the entire amount of the reaction product. However, the quantity of the reaction product to be retained in the vessel should not be too much to prevent the proceeding of efficient terminal reaction, so that it is preferable to leave not more than 30%, particularly not more than 20% of the volume of entire reaction product in the first crystallizer.

In the process of the present invention, a portion of the reaction product contained in the oxidation reactor is withdrawn intermittently, so that the oxidation reaction should be carried out by using an apparatus with which the reaction product can be discharged in an efficient manner. Any method or apparatus may be employed so far as they are provided with means or devices for intermittently discharging the reaction product. A preferred example of a reaction apparatus to be employed is of the following type:

The reactor is equipped with a liquid level meter correlated with a detector and signal generator by which a control valve of a discharge line through which the reaction product is withdrawn is operated in such a manner that the valve is kept opened when the liquid level of the reaction product has reached its upper limit level and the valve is closed when the liquid level of the reaction product has reached its lower limit. In this case, the upper limit and the lower limit of the liquid level are respectively determined at a location within the region between maximum liquid level and minimum liquid level wherein the continuous oxidation reaction takes place smoothly. For this purpose, the use of a gamma-ray type liquid level meter is especially desirable. However, any other type of liquid level meter may be of course employed, but they often cause trouble in the operation and reliability due to the corrosion with solvent and the presence of crystalline terepthalic acid in the liquid.

An example of one embodiment of the present invention will be illustrated in detail hereinbelow by referring to the drawing.

In the drawing, the numerals used indicate that 1 is an oxidation reactor, 2 is a stirrer, 3 is a motor for driving the stirrer, 4 is a conduit for introducing p-xylene charge stock, solvent and catalyst, 5 is a conduit for introducing oxygen-containing gas, 6 is a conduit for withdrawing reaction product, 7 is a conduit for evacuating gas, 8 is a condenser, 9 is a receiver for condensed liquid, 10 is a conduit for returning the condensed liquid and 11 is a conduit for exhausting off-gas. Numeral 12 is a first crystallizer for effecting terminal reaction and crystallizing operations of the reaction product withdrawn from reactor 1, 13 is a stirrer, 14 is a motor for rotating the stirrer, 15 is a conduit for introducing oxygencontaining gas, 16 is a conduit for discharging the reaction product, 17 is a gas discharging conduit, 18 is a condenser, 19 is a receiver for condensed liquid, 20 is a conduit for returning the condensed liquid, 20 is a conduit for returning the condensed liquid and 21 is an off-gas exhaust. Moreover, numeral 22a is a gamma-ray source provided to reactor 1, and 22b is a gamma-ray detecting device, the signal of the liquid level detected thereby being used for opening and closing operations of control valve 24 (provided in the reaction product discharging line 6) through connection 23. Liquid level meters 22a, 22b and control valve 24 are set so as to open the valve when the liquid level in the reactor reaches the upper limit level 25. The numeral 27 in first crystallizer 12 indicates a liquid level which is reached when the reaction product withdrawn from reactor 1 has been charged thereinto, and 28 indicates a liquid level at which the reaction product has been discharged after the completion of the terminal reaction.

In carrying out the continuous production of highly pure terephthalic acid by employing the apparatus as illustrated in the drawing, a feed mixture comprising each in requisite amount of p-xylene, solvent and catalyst is continuously charged into reactor 1 through conduit 4, and oxygen-containing gas is continuously introduced from conduit 5 into the stirred reaction liquid to thereby effect continuous liquid phase oxidation of p-xylene. A gaseous mixture comprising unreacted oxygen-containing gas, vaporized solvent, water formed by the reaction and other unreacted reactants is discharged from exhaust conduit 7, cooled in condenser 8 and introduced into receiver tank 9 while discharging uncondensed waste gas out of the system through conduit 11 and returning the condensed liquid into the reactor via conduit 10. As the oxidation reaction proceeds, the liquid level of the content in the reactor ascends to reach the upper limit level 25. In this instance, a gammaray type liquid level meters 22a, 22b generate signal for actuating the opening motion of the valve 24 which has been closed until that time. The liquid level in the reactor then gradually descends as the reaction product is withdrawn therefrom, and when it has reached its lower limit level 26, the liquid level meter again generates signal to close the control valve. By operating in this manner, the reaction product intermittently withdrawn from reactor 1 is sent to first crystallizer 12 via conduit 6. The liquid volume of discharge at one time is adjusted such that it is equal to the volume of the liquid contained within the region between the upper limit level 27 and the lower limit lever 28. Thereafter, the terminal reaction is effected by introducing oxygen-containing gas from line 15 into the reaction product which has now reached its upper limit level 27 by being transferred from reactor 1 as one batch charge, under stirring for the period of 1–5 minutes by means of stirrer 13. The reaction product which has finished the terminal reaction is then withdrawn from conduit 16 in such a rate that one portion of the discharge therefrom cause a drop of the liquid level down to level 28. This portion is then passed to a second crystallizer (not shown) and, if necessary, further conveyed to a third crystallizer.

At the time when the liquid level of the contents in the reactor 1 reaches level 25 after the discharge of the product of terminal reaction from the first crystallizer has completed, another one-time portion of liquid discharged from reactor 1 is introduced to first crystallizer 12 and the terminal reaction is repeated similarly.

According to the present invention, as set forth hereinabove, it is now possible to obtain highly pure terephthalic acid in a simple oxidation reaction, without requiring any preliminary purification treatments, by the improved and simplified process involving intermittently charging a defined portion of a reaction product obtained by the continuous oxidation of p-xylene into a crystallizer having a limited capacity and intermittently carrying out terminal reaction therein by contacting the charged reaction product with molecular oxygen within a short period of time, to thereby complete the terminal reaction of the reaction materials and intermediate products contained in the reaction product in a high efficiency for a short duration of time without causing explosion hazards. Therefore, the process of this invention is of great advantage in economical and industrial viewpoints.

The present invention will be described in further detail by the following examples which should in no way be interpreted to limit the scope of the invention.

EXAMPLE 1

The reaction was carried out using an apparatus, as shown in the drawing, which is composed of a titanium-lined pressure-resistant reactor (internal capacity of 40 liters) equipped with a reflux condenser, stirrer, heating means, inlet for charge stock, inlet for oxygen-containing gas, outlet for reaction product and a gamma-ray type liquid level meter; a titaniumlined and pressure-resistant first crystallizer with an internal capacity of 5 liters which is equipped with, similarly to the reactor, a reflux condenser, stirrer, heating means, inlet for charge stock, inlet for oxygen-containing gas and outlet for the reacted product; and second and third crystallizers each having an inner capacity of 40 liters.

The reactor was firstly charged with 12 Kg of acetic acid, 61 g of cobalt acetate, 3 g of manganese acetate and 36 g of sodium bromide, and the contents so charged were kept at a temperature of 190°C under the pressure of 20 Kg/cm$^2$. To this reactor, air and p-xylene were introduced at a flow rate of 4.2 NM$^3$/Kg-p-xylene and 2.4 Kg/hr., respectively, for a period of 30 minutes. Under continuous introduction of air and p-xylene at those rates, the reactor was successively charged with a catalyst-acetic acid solution (the ratio of cobalt acetate, manganese acetate and sodium bromide to acetic acid used was the same as that initially charged to the reactor) at the rate of 7.2 Kg/hr. Meanwhile, the reaction product was intermittently and periodically withdrawn from the reactor and charged to the subsequent first crystallizer in response to the signal from the level meter in the amount of about 2 Kg on each time at the interval of about 10 minutes. The first crystallizer charged with the reaction product from the reactor was operated at a temperature of 185°C under a pressure of 14 Kg/cm² while introducing air immediately at the flow rate of 1.6 NM³/hr. for 2 minutes (the oxygen concentration inside the system at this instance was 5% by volume) to thereby effect terminal reaction. After the terminal reaction was completed in the first crystallizer, the contents were subsequently introduced to the second crystallizer while leaving constantly about 0.5 Kg of the liquid content in the first crystallizer on each time. The second and third crystallizers were operated under 7 Kg/cm² pressure and atmospheric pressure, respectively, with an average residence time in each about 60 minutes to thereby effect crystallization of terephthalic acid. The effluent continuously withdrawn from the third crystallizer was then subjected successively to solid-liquid separation, washing and drying to give terephthalic acid, the properties and yield of which are shown in Table 1.

COMPARATIVE EXAMPLE 1

The procedure of Example 1 was repeated in the same way except that a titanium-lined vessel having an inner capacity of 40 liters was used instead as the first crystallizer in which a great amount of the reaction product withdrawn from the reactor stagnated, and the reaction product was intermittently charged with portions of 2 Kg at one time to this first crystallizer together with air at the rate of 1.6 NM³/hr. for a period of 2 minutes for each intermittent charge (the oxygen concentration in the system was 5% by volume) to thereby effect terminal reaction, while intermittently withdrawing the reaction product at a rate equal to that charged thereto. The properties and yield of terephthalic acid so obtained are given in Table 1.

It will be seen from the result that neither purity nor color tone of the terephthalic acid so obtained is satisfactory compared to that obtained according to the procedure of Example 1, though the charging and discharging of the reaction product are operated intermittently in the first crystallizer. This is apparently attributable to the fact that the newly charged reaction product undergoes insufficient terminal reaction in the large-sized crystallizer in which the reaction product containing active components to be further oxidized are dispersed over the reaction mass of large quantity and subjected to the terminal reaction at a greatly reduced concentration.

COMPARATIVE EXAMPLE 2

The procedure of Comparative Example 1 was entirely repeated except that the rate of the introduction of air was raised to 4.2 NM³/hr. The properties and yield of terephthalic acid so obtained are shown in Table 1. In this example, the yield and properties of terephthalic acid are improved to a certain extent, but the procedure cannot be put into industrial practice because the oxygen concentration reaches as high as 15%, which is far beyond the maximum explosive limit during the operation.

COMPARATIVE EXAMPLE 3

The procedure of Comparative Example 1 was wholly repeated except that no air was introduced to the first crystallizer. The result in the properties and quality of terephthalic acid so obtained are shown in Table 1. It is noticed from the result that the purity and color of terephthalic acid obtained in this example exhibits marked deterioration because of no terminal reaction effected therein.

TABLE 1

|  | Example 1 | Comp. Ex. 1 | Comp. Ex. 2 | Comp. Ex. 3 |
| --- | --- | --- | --- | --- |
| Purity (% by weight) | 99.97 | 99.96 | 99.97 | 99.94 |
| 4-Carboxybenzaldehyde (PPM) | 300 | 370 | 290 | 570 |
| Molecular extinction coefficient 1/ ($\epsilon$ 380 m$\mu$) | 0.01 | 0.02 | 0.01 | 0.05 |
| Color difference b-value 2/ | −0.2 | +0.6 | −0.2 | +2.0 |
| Yield (mol%) | 96 | 94 | 96 | 92 |
| Oxygen concentration in first crystallizer (% by volume) | 5 | 5 | 15 | 1 |

1/ Values of absorption at 380 m$\mu$ measured with the use of a spectrophotometer as to a solution of 5 g terephthalic acid in 100 ml. of 2N aqueous ammonia. The less the value, the better the color.

2/ The value indicates so-called "apparent color" obtained by measuring reflective light of terephthalic acid (solid) with the use of Color Machine CM-20, manufactured by Color Machine Co., all b-value indicates yellowness, the less the value, the better being the color.

What is claimed is:

1. In a process for the continuous production of highly pure terephthalic acid wherein p-xylene is continuously charged into an oxidation reactor together with a solvent and an oxidation catalyst and oxidized in the liquid phase with molecular oxygen or a molecular oxygen-containing gas, and by means of crystallization terephthalic acid so formed is separated and recovered from the reaction mixture, the improvement which comprises operating the following steps:

a. intermittently withdrawing a portion of the oxidized reaction product from the oxidation reactor,
   b. introducing the withdrawn reaction product into a small-sized first crystallizer having a capacity sufficient to contain an amount withdrawn at one time,
   c. oxidatively treating the above reaction product in the first crystallizer at a temperature and pressure nearly equal to or below that employed in the preceding oxidation reaction, by introducing molecular oxygen-containing gas for a period of 1–5 minutes at such a rate that the oxygen concentration in the system never exceed the explosive limit during the treatment, and
   d. withdrawing the major portion of the reaction product contained in the first crystallizer and passing it to a subsequent second crystallizer and crystallizing terephthalic acid therein.

2. A process as described in claim 1, in which acetic acid is used as the solvent.

3. A process as described in claim 1, in which the solvent is used in the amount of two to six times by weight of p-xylene.

4. A process as described in claim 1, in which the catalyst used contains cobalt, manganese and bromine.

5. A process as described in claim 1, in which the air is used as the molecular oxygen-containing gas.

6. A process as described in claim 1, in which the oxidation reaction of p-xylene is carried out at a temperature within the range of 80°–250°C under a pressure within the range of 2–30 Kg/cm² gauge.

7. A process as described in claim 1, in which the average residence time of the reactants in the oxidation reactor is 0.5–6 hours.

8. A process as described in claim 1, in which the reaction product is intermittently withdrawn from the oxidation reactor and charged to the first crystallizer at an interval of 2–10 minutes.

9. A process as described in claim 1, in which the first crystallizer used has a capacity such that the reaction product withdrawn at one time from the oxidation reactor occupies 30–70% of the total capacity of the crystallizer.

10. A process as described in claim 1, in which the oxidation treatment is with the molecular oxygen-containing gas, and the treatment of the reaction product in the first crystallizer is carried out at a temperature within the range of 80°–250°C. under a pressure within the range of 2–30 Kg/cm² gauge.

11. A process as described in claim 1, in which the reaction product obtained after the oxidative treatment in the first crystallizer is passed to the second crystallizer at such a rate that not more than 30% of the reaction product is always left in the first crystallizer.

12. A process for the continuous production of highly pure terephthalic acid wherein p-xylene is continuously charged to an oxidation reactor together with a solvent and an oxidation catalyst and oxidized therein in the liquid phase with molecular oxygen or a molecular oxygen-containing gas for an average residence time of the reactants of 0.5–6 hours and terephthalic acid so formed is separated and recovered by means of crystallization from the reaction mixture, the improvement which comprises operating the following steps:
   a. intermittently withdrawing a portion of the oxidized reaction product from the oxidation reactor at an interval of every 2–10 minutes,
   b. charging the withdrawn reaction product into a small-sized crystallizer having such a capacity that the amount of the withdrawn reaction product at each time occupies 30–70% by volume of the total capacity of the first crystallizer,
   c. oxidatively treating the above reaction product in said first crystallizer at a temperature and pressure nearly equal to or below that employed in the preceding oxidation reaction, by introducing molecular oxygen-containing gas for a period of 1–5 minutes at such a rate that the oxygen concentration in the system never exceeds the explosive limit during the treatment, and
   d. withdrawing a major portion of the reaction product contained in the first crystallizer and thereafter sending it to the subsequent second crystallizer.

13. A process as described in claim 1, in which the oxidation reaction of p-xylene is carried out at a temperature within the range of 130°–200°C.

14. A process as described in claim 1, in which the average residence time of the reactants in the oxidation reactor is 1–3 hours.

15. A process as described in claim 1, in which the first crystallizer used has a capacity such that the reaction product withdrawn at one time from the oxidation reactor occupies 50–70% of the total capacity of the crystallizer.

16. A process as described in claim 1, in which the oxidation treatment with the molecular oxygen-containing gas of the reaction product in the first crystallizer is carried out at a temperature within the range of 130°–200°C under a pressure within the range of 2–30 Kg/cm² gauge.

17. A process as described in claim 1, in which the reaction product obtained after the oxidative treatment in the first crystallizer is passed to the second crystallizer at such a rate that not more than 20% of the reaction product is always left in the first crystallizer.

18. A process as described in claim 12 wherein the average residence time of the reactants in the oxidation reactor is 1–3 hours and in step (b) the capacity of the small-sized crystallizer is such that the amount of the withdrawn reaction product at each time occupies 50–70% by volume of the total capacity of the first crystallizer.

19. A process as described in claim 1, wherein the portion of the oxidized reaction product intermittently withdrawn in step (a) is equivalent to the sum of p-xylene plus oxidation catalyst and solvent liquid introduced to the oxidation reactor during a period within the range of 2–10 minutes, adjusted by the increased volume of the contents due to the reaction conditions.

20. A process as described in claim 19, where the capacity of the first crystallizer is smaller than that of the oxidation reactor.

21. A process as described in claim 1, wherein in the first crystallizer a combined crystallization of terephthalic acid and oxidation of intermediate products from the oxidation reaction occur.

22. A process as described in claim 21, wherein said intermediate products include 4-carboxybenzaldhyde and a p-toluic acid.

23. A process as claimed in claim 1, wherein the molecular oxygen-containing gas introduced in the oxidative treating of step (c) is air, and the quantity of air introduced is 10–50 NM³ per ton of reaction product.

24. A process as described in claim 1, further comprising the steps of solid liquid separation to obtain solid terephthalic acid and then washing and drying the solid terephthalic acid.

25. A process as described in claim 1, wherein withdrawing of the major proportion of the reaction product contained in the first crystallizer is on an intermittent basis, occurring at the completion of the oxidative treatment.

* * * * *